United States Patent
Long et al.

(10) Patent No.: US 7,421,888 B2
(45) Date of Patent: Sep. 9, 2008

(54) REGENERATIVE SYSTEM FOR TESTING TORQUE CONVERTERS AND OTHER TRANSMISSION COUPLING DEVICES

(75) Inventors: Denis Long, San Antonio, Bexar County, TX (US); Glenn Wendel, Pipe Creek, Bandera County, TX (US)

(73) Assignee: Southwest Research Institute, San Antonio, TX (US)

(*) Notice: Subject to any disclaimer, the term of this patent is extended or adjusted under 35 U.S.C. 154(b) by 30 days.

(21) Appl. No.: 11/608,060

(22) Filed: Dec. 7, 2006

(65) Prior Publication Data

US 2007/0266796 A1 Nov. 22, 2007

Related U.S. Application Data

(60) Provisional application No. 60/753,073, filed on Dec. 12, 2005.

(51) Int. Cl.
*G01M 15/00* (2006.01)
(52) U.S. Cl. ....................................... 73/118.1
(58) Field of Classification Search .................. 73/112, 73/116, 117.2, 117.3, 118.1, 119 R
See application file for complete search history.

(56) References Cited

U.S. PATENT DOCUMENTS

| | | | |
|---|---|---|---|
| 3,942,363 A | 3/1976 | Swis et al. ..................... | 73/116 |
| 4,274,281 A | 6/1981 | Hoodwin ..................... | 73/118 |
| 4,355,274 A | 10/1982 | Bourbeau ..................... | 318/812 |
| 4,356,724 A * | 11/1982 | Ayoub et al. ................ | 73/118.1 |
| 4,788,857 A | 12/1988 | Myers ........................ | 73/118.1 |
| 5,344,570 A | 9/1994 | McLachlan et al. ......... | 210/709 |
| 5,458,011 A | 10/1995 | Thompson ................. | 73/865.9 |
| 5,598,908 A | 2/1997 | York et al. .................. | 192/21.5 |
| 5,915,496 A | 6/1999 | Bednar et al. ............... | 180/305 |
| 6,651,493 B2 * | 11/2003 | Myers et al. ............... | 73/119 R |
| 6,719,080 B1 | 4/2004 | Gray, Jr. ..................... | 180/165 |
| 2002/0005074 A1 * | 1/2002 | Myers et al. .................. | 73/862 |

OTHER PUBLICATIONS

International Search Report with Written Opinion, PCT/US06/61731, 9 pages, Oct. 29, 2007.

* cited by examiner

*Primary Examiner*—Eric S McCall
(74) *Attorney, Agent, or Firm*—Baker Botts LLP

(57) ABSTRACT

A test system for testing torque converters, other fluid coupling devices, and the like, e.g., devices that couple engine power to driveline power. The test system drives the test device with a first hydraulic motor, which is itself driven by a first hydraulic pump. At the output of the test device, a second hydraulic pump absorbs the power from the test device, and drives a second hydraulic motor, which in turn drives the first hydraulic pump. A make-up motor is used to also drive the first hydraulic pump, to make up for any additional power desired for testing.

16 Claims, 1 Drawing Sheet

REGENERATIVE SYSTEM FOR TESTING TORQUE CONVERTERS AND OTHER TRANSMISSION COUPLING DEVICES

RELATED PATENT APPLICATION

This application claims the benefit of U.S. Provisional Application No. 60/753,073 filed Dec. 12, 2005, and entitled "Regenerative System for Testing Torque Converters and Other Transmission Coupling Devices."

TECHNICAL FIELD OF THE INVENTION

This invention relates to the testing of mechanical devices, and in particular, testing automotive torque converters and other transmission-related components.

BACKGROUND OF THE INVENTION

All vehicles need some means for allowing the engine to continue turning if the vehicle comes to a stop. Manual transmission vehicles use a clutch, which disconnects the engine from the transmission. Automatic transmission vehicles use a torque converter, a type of fluid coupling that allows the engine to turn somewhat independently of the transmission. Engineers who design automatic transmissions and their components have devised various methods for testing and evaluating them, including torque converters. Evaluating the performance of a torque converter requires that power be supplied to, as well as absorbed from, the torque converter. The use of actual engines as the driving power for such testing is usually considered impractical because of the cost of fuel and maintenance and the problem of controlling emissions. As a result, electric motors are often used as the driving device, but these motors are required to be large and expensive for proper testing and the high accelerations during testing can be damaging to the motor. The absorbing devices are typically dynamometers, which dissipate energy in the form of heat or electricity, and can also be costly.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
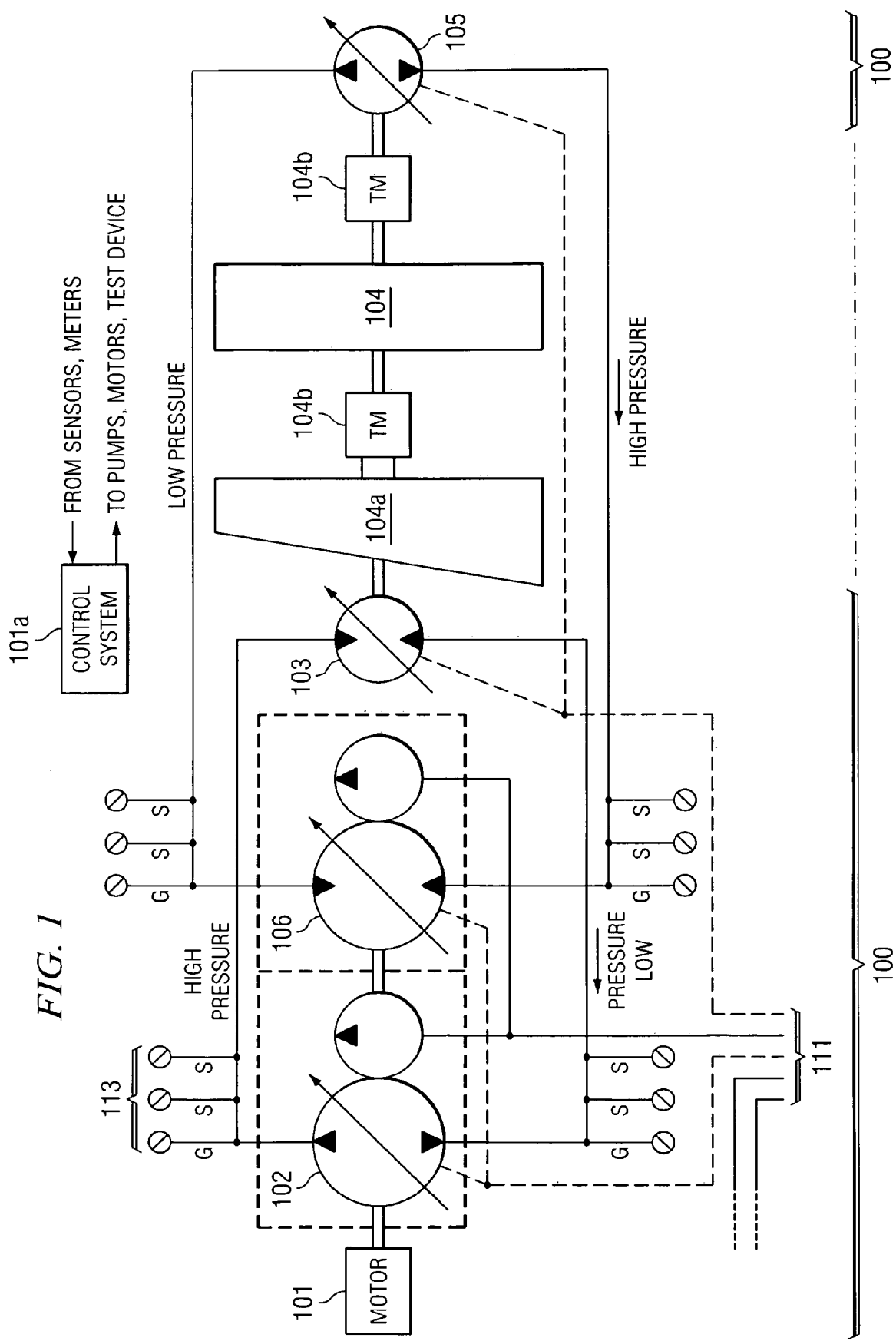
FIG. 1 illustrates a test system for testing a torque converter or other transmission coupling device in accordance with the invention.

The invention described herein is directed to a "regenerative test stand" and an associated method for evaluating torque converters and similar devices. As explained below, the test stand absorbs power from the torque converter, regenerates the power and supplies it to the input of the torque converter. More specifically, hydraulic pumps and motors are used to recover energy at the output of the torque converter and to use the energy to assist in powering the input to the torque converter. Make-up power is provided by an electric motor.

FIG. 1 illustrates a regenerative test system 100 in accordance with the invention. In the example of FIG. 1, system 100 is being used to test a torque converter 104. Although this description is mostly in terms of testing a torque converter such as the type used for today's vehicles, the same concepts apply to other "fluid couplers". Such devices may be found in applications other than automotive, such as for use with industrial type variable speed engines. Furthermore, the regenerative test stand has application to gear type transmissions, rather than fluid couplers. Thus, in a most general sense, any type of transmission device that couples the mechanical power of an engine or motor to mechanical power for a driveline may be tested using system 100, and the test device is generally referred to herein as an "transmission coupling device"

An electric motor 101, which may be a constant speed motor, is used to make up for system losses. The required output power of motor 101 is determined by the test conditions and the system losses.

A variable displacement hydraulic pump 102 is driven by the motor shaft of motor 101. An example of a suitable type of pump is a variable displacement pump having a capacity of 130 cc. Pump 102 may be an axial piston pump, that is, a pump that uses an axial reciprocating piston motion principle to rotate the output shaft, but other types of pumps are possible.

Pump 102 delivers high-pressure hydraulic fluid to a variable displacement hydraulic motor 103, i.e., a motor that transforms fluid energy into rotary mechanical power, which typically is applied to a load via shaft. In system 100, motor 103 delivers its mechanical power to the torque converter 104.

In the example of FIG. 1, motor 103 is a bent-axis piston motor having a capacity of 110 cc. Bent-axis piston motors develop torque through a reaction to pressure on reciprocating pistons, such as by mounting the cylinders and drive shaft at an angle to each other with the reaction being against a drive-shaft flange. In general, bent-axis motors are capable of higher speeds than other hydraulic motors. However, other piston and non piston type hydraulic motors could be used.

Torque converter 104, which is driven by motor 103, is shown mounted on a headstand 104a. Torque meters 104b at the input and output of torque converter 104 provide torque values to the control system 101a.

Mechanical power is absorbed from the torque converter 104 by a variable displacement hydraulic pump 105, which converts this mechanical power into hydraulic power. In the example of FIG. 1, pump 105 is a bent-axis piston pump, which is capable of achieving higher speeds than other types of pumps, but other types of pumps may be used.

High-pressure fluid from pump 105 is delivered to motor 106, which is mounted on a common shaft with pump 102 and motor 101. This permits both motor 106 and motor 101 to drive pump 102. An example of a suitable motor 106 is an axial piston motor having a capacity of 130 cc.

It should be understood that the pumps and motors described herein may be the same device. In other words, the same device may be used as a pump or motor depending on whether its input is hydraulic and output mechanical, or vice versa. In general, these pumps and motors can be various types of positive variable displacement devices, which may be controlled electronically by software associated with system 100.

In operation, motor 101 provides power to input pump 102. The high pressure side of input pump 102 provides hydraulic fluid to input motor 103, which provides power to torque converter 104.

Output pump 105 absorbs mechanical energy from the torque converter 104. The high pressure side of pump 105 provides hydraulic fluid to motor 106, which assists motor 101 in driving input pump 102.

FIG. 1 illustrates the high and low pressure lines associated with system 100 in bold. The dotted lines represent drain lines, which are typical of a hydraulic system, and carry excess fluid to reservoir 111. Various pumps, coolers, and filters that may be used at the input and output to the reservoir 111 are not shown. Various gauges and sensors 113 on the hydraulic lines deliver values representing parameters such as oil pressure and oil temperature to control system 110.

System 100 may be controlled in any suitable manner, using appropriate hardware and programming, designated as control system 110. Typically, system 100 is electronically controlled using a computer and a real-time control system that delivers operating commands and receives sensor inputs. A control loop may be used to control input and output torque of torque converter 104, based on readings from sensors 104a. Control system 110 also receives input from other sensors, such as sensors 113, and delivers control signals to the hydraulic pumps and motors.

System 100 may be used to test both transient and steady state torque and speed conditions. For example, in transient testing, system 100 may be used to simulate a wide open throttle condition, where a driver accelerates hard from a stop.

What is claimed is:

1. A system for testing a transmission coupling device, comprising:
    a make up motor;
    a first hydraulic pump driven by the make-up motor;
    a first hydraulic motor driven by the hydraulic pump, and connected to deliver mechanical power to the transmission coupling device;
    a second hydraulic pump, driven by mechanical power from the transmission coupling device;
    a second hydraulic motor driven by the hydraulic pump;
    wherein the make up motor and the second hydraulic motor are connected such that both the make-up motor and the second hydraulic motor drive the first hydraulic pump.

2. The system of claim 1, wherein the transmission coupling device is a torque converter.

3. The system of claim 1, wherein the first hydraulic pump is an axial piston pump.

4. The system of claim 1, wherein the first hydraulic motor is an axial piston motor.

5. The system of claim 1, wherein the second hydraulic pump is a bent-axis pump.

6. The system of claim 1, wherein the second hydraulic motor is a bent-axis motor.

7. The system of claim 1, wherein each pump and each motor is a variable speed device.

8. The system of claim 1, wherein the make-up motor is a constant speed motor.

9. The system of claim 1, further comprising a control system programmed to control operation of the transmission coupling device to a desired torque input or output.

10. A method of testing a transmission coupling device, comprising:
    using a make up motor to drive a first hydraulic pump;
    using the hydraulic pump to drive a first hydraulic motor;
    using the first hydraulic motor to deliver mechanical power to the transmission coupling device;
    using a second hydraulic pump to absorb mechanical power from the transmission coupling device, and to drive a second hydraulic motor; and
    using the second hydraulic motor to assist in driving the first hydraulic pump.

11. The method of claim 10, wherein the transmission coupling device is a torque converter.

12. The method of claim 10, wherein the transmission coupling device is a fluid coupler.

13. The method of claim 10, wherein the transmission coupling device is a gear transmission.

14. The method of claim 10, further comprising the step of determining a desired torque input and calculating the output required for the make-up motor, based on the power provided by the second hydraulic motor.

15. The method of claim 10, wherein each pump and each motor is a variable speed device.

16. The method of claim 10, wherein the make-up motor is a constant speed motor.

\* \* \* \* \*